US010392265B2

(12) United States Patent
Yang

(10) Patent No.: US 10,392,265 B2
(45) Date of Patent: Aug. 27, 2019

(54) WATER FILTRATION SYSTEM

(71) Applicants: FOSHAN SHUNDE MIDEA WATER DISPENSER MFG. CO., LTD., Foshan (CN); MIDEA GROUP CO., LTD., Foshan (CN)

(72) Inventor: Lyu Yang, Foshan (CN)

(73) Assignee: FOSHAN SHUNDE MIDEA WATER DISPENSER MFG. CO., LTD., Foshan, Guangdong (CN)

( * ) Notice: Subject to any disclaimer, the term of this patent is extended or adjusted under 35 U.S.C. 154(b) by 0 days.

(21) Appl. No.: 15/857,390

(22) Filed: Dec. 28, 2017

(65) Prior Publication Data

US 2018/0257948 A1 Sep. 13, 2018

Related U.S. Application Data

(63) Continuation of application No. PCT/CN2017/087305, filed on Jun. 6, 2017.

(30) Foreign Application Priority Data

Mar. 7, 2017 (CN) .......................... 2017 1 0132251
Mar. 7, 2017 (CN) ..................... 2017 2 0218895 U

(51) Int. Cl.
*C02F 1/00* (2006.01)
*C02F 1/44* (2006.01)

(52) U.S. Cl.
CPC .............. *C02F 1/006* (2013.01); *C02F 1/003* (2013.01); *C02F 1/008* (2013.01); *C02F 1/44* (2013.01);

(Continued)

(58) Field of Classification Search
CPC .......... C02F 1/003; C02F 1/006; C02F 1/008; C02F 1/44; C02F 1/441; C02F 1/442;

(Continued)

(56) References Cited

U.S. PATENT DOCUMENTS 4,332,685 A 6/1982 Nowlin et al.

FOREIGN PATENT DOCUMENTS

CN 203728658 U 7/2014
CN 204508962 U 7/2015

(Continued)

OTHER PUBLICATIONS

Foshan Shunde Midea Water Dispenser Mfg. Co. Ltd. et al., Extended European Search Report, EP17743235.8, dated Mar. 19, 2018, 10 pgs.

*Primary Examiner* — Terry K Cecil
(74) *Attorney, Agent, or Firm* — Morgan, Lewis & Bockius LLP

(57) ABSTRACT

A water filtration system includes a raw water inlet; a pure water outlet; a purified water outlet; a waste water outlet; an integrated filter cartridge having first through sixth ports, of which the third port is connected to a first end of a communication flow path, and a second end of the communication flow path is connected to the second port and the purified water outlet, a water storage device is disposed to at least one of a flow path connected to the pure water outlet and the sixth port; and a return flow path having a first end connected to the purified water outlet and the second port and a second end connected to the waste water outlet and the fifth port.

12 Claims, 1 Drawing Sheet

(52) U.S. Cl.
CPC .............. *C02F 1/441* (2013.01); *C02F 1/442* (2013.01); *C02F 2201/005* (2013.01); *C02F 2201/006* (2013.01); *C02F 2209/03* (2013.01); *C02F 2209/42* (2013.01); *C02F 2301/043* (2013.01); *C02F 2301/046* (2013.01); *C02F 2307/10* (2013.01); *C02F 2307/12* (2013.01)

(58) Field of Classification Search
CPC .......... C02F 2201/005; C02F 2201/006; C02F 2209/03; C02F 2209/42; C02F 2301/043; C02F 2301/046; C02F 2307/10; C02F 2307/12
See application file for complete search history.

(56) References Cited

FOREIGN PATENT DOCUMENTS

| | | | |
|---|---|---|---|
| CN | 204625367 | U | 9/2015 |
| FR | 2979339 | A1 | 3/2013 |
| WO | WO2015/131422 | A1 | 9/2015 |

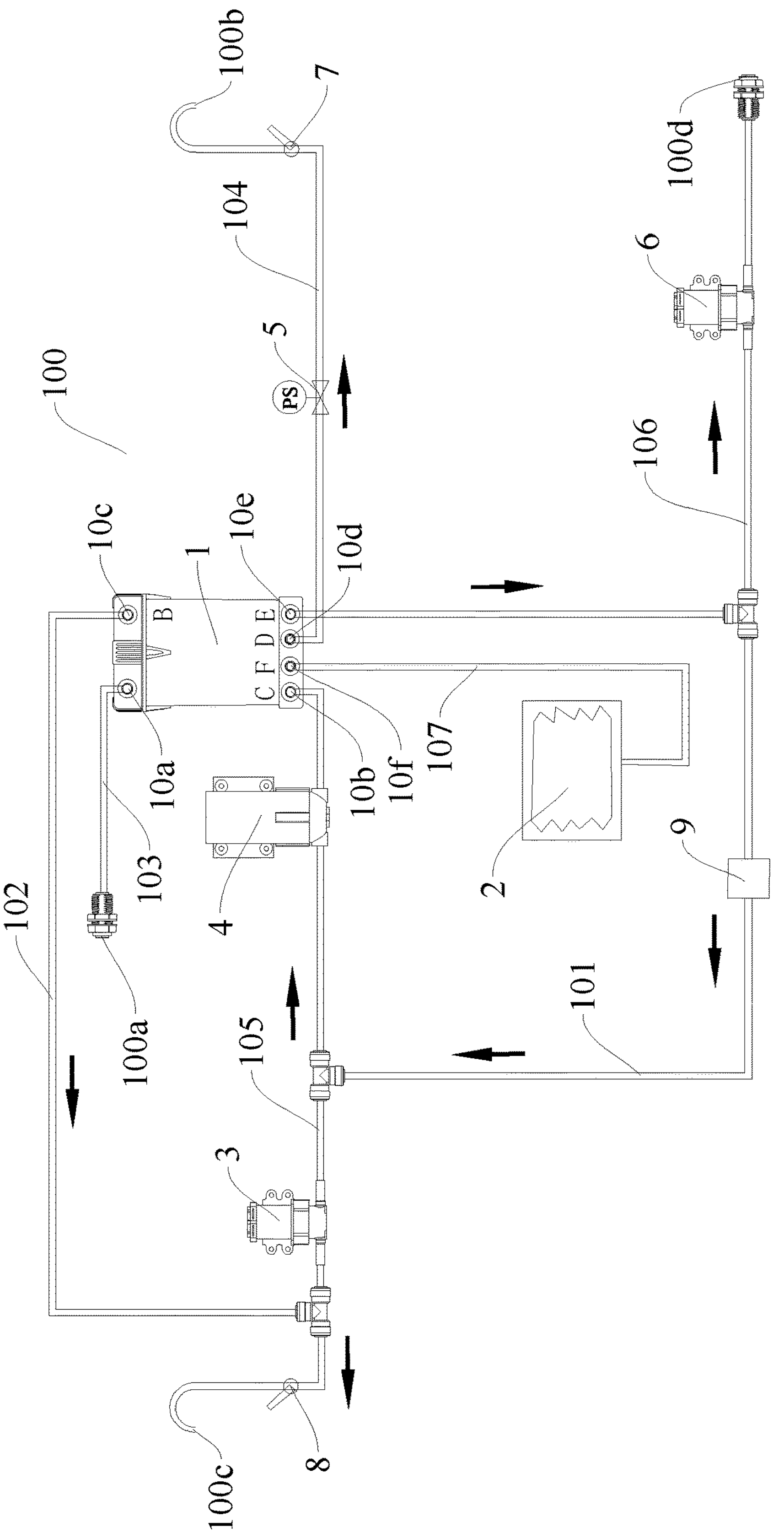
100
100a
100b
100c
100d
1
2
3
4
5
PS
6
7
8
9
10a
10b
10c
10d
10e
10f
B
C
D
E
F
101
102
103
104
105
106
107

WATER FILTRATION SYSTEM

PRIORITY CLAIM AND RELATED APPLICATION

This application is a continuation application of PCT/CN2017/087305, entitled "WATER FILTRATION SYSTEM" filed on Jun. 6, 2017, which claims priority to Chinese Patent Application No. 201710132251.9, filed with the State Intellectual Property Office of the People's Republic of China on Mar. 7, 2017, and entitled "WATER FILTRATION SYSTEM", and Chinese Patent Application No. 201720218895.5, filed with the State Intellectual Property Office of the People's Republic of China on Mar. 7, 2017, and entitled "WATER FILTRATION SYSTEM", all of which are incorporated herein by reference in their entirety.

FIELD

The present disclosure relates to a technical field of water purification, and more particularly to a water filtration system.

BACKGROUND

In the related art, in order to ensure a service life of a fine filter cartridge of a water filtration system of a water purifier, a recycling rate of the water filtration system (a ratio of pure water flow rate to raw water flow rate) is usually low, so that pure water flux of the water filtration system is small, which causes waste of water resources.

SUMMARY

Embodiments of the present disclosure seek to solve at least one of the problems existing in the related art. Thus, the present disclosure is to propose a water filtration system, which improves a recycling rate of the water filtration system under the premise of ensuring a service life of a fine filter cartridge.

The water filtration system according to embodiments of the present disclosure, includes: a raw water inlet; a pure water outlet; a purified water outlet; a waste water outlet; an integrated filter cartridge including a pre-filter cartridge, a fine filter cartridge and a post-filter cartridge, and having a first port, a second port, a third port, a fourth port, a fifth port and a sixth port, in which the first port is connected to the raw water inlet, the second port is connected to the purified water outlet, a first end of a communication flow path is connected to the third port, a second end of the communication flow path is connected to the second port and the purified water outlet via a T-shaped connector, the fourth port is connected to the pure water outlet, raw water entering the raw water inlet is configured to flow out through the pure water outlet after being filtered by the pre-filter cartridge, the fine filter cartridge and the post-filter cartridge successively, the raw water entering the raw water inlet is configured to flow out through the purified water outlet after being only filtered by the pre-filter cartridge, the fifth port is connected to the waste water outlet, and a water storage device is disposed to at least one of a flow path connected to the pure water outlet and the sixth port; and a return flow path having a first end connected to the purified water outlet and the second port via a T-shaped connector and a second end connected to the waste water outlet and the fifth port via a T-shaped connector.

In the water filtration system according to embodiments of the present disclosure, by providing the water filtration system with the return flow path, the recycling rate of the water filtration system is improved under the premise of ensuring the service life of the fine filter cartridge. Furthermore, by disposing the water storage device to at least one of the flow path connected to the pure water outlet and the fourth port of the water filtration system, a requirement of the user for a large amount of water can be satisfied. Meanwhile, the water filtration system can obtain water of two kinds of water quality, i.e. the pure water and the purified water, to improve a utilization rate of water resources and achieve water conservation According to some embodiments of the present disclosure, the return flow path is provided with a throttle valve, so that a water inlet pressure in the integrated filter cartridge before the fine filter cartridge is maintained.

According to some embodiments of the present disclosure, the return flow path is provided with a flow control valve, so that a water saving effect is achieved while the service life of the fine filter cartridge is ensured.

According to some embodiments of the present disclosure, the return flow path is provided with a switch. Thus, waste water flux of the water filtration system is reduced, and pure water flux of the water filtration system is promoted.

According to some embodiments of the present disclosure, the pre-filter cartridge is disposed separately from the fine filter cartridge and the post-filter cartridge. Thus, a flow path inside the integrated filter cartridge is simplified.

According to some embodiments of the present disclosure, a flow path connected to the waste water outlet is provided with a waste water valve, which also maintains the water inlet pressure in the integrated filter cartridge before the fine filter cartridge.

According to some embodiments of the present disclosure, a water inlet valve and a booster pump are disposed between the second port and the purified water outlet, the water inlet valve is located between the purified water outlet and the booster pump, the second end of the communication flow path is located at a side of the water inlet valve adjacent to the purified water outlet, and the first end of the return flow path is located between the water inlet valve and the booster pump. Thus, the water filtration system can obtain water of two kinds of water quality, i.e. the pure water and the purified water, to improve the utilization rate of water resources, and normal operation of the water filtration system can be ensured by providing the return flow path.

According to some embodiments of the present disclosure, the water storage device is provided with a detection device, the detection device includes at least one of a pressure detection device and a liquid level detection device, and when the detection device detects that the water storage device is not full of liquid, a controller of the water filtration system controls the water inlet valve to open and controls the booster pump to operate. Thus, an automatic water storage function of the water filtration system is achieved.

According to some embodiments of the present disclosure, a pre-filtering mesh is disposed between the first port and the raw water inlet.

According to some embodiments of the present disclosure, a one-way valve and a high pressure switch are disposed between the fourth port and the pure water outlet, and the one-way valve and the high pressure switch are integrated into one piece. Thus, components of the water filtration system can be reduced and the water filtration system can be simplified.

According to some embodiments of the present disclosure, the water storage device is configured as a water storage bag, a pressure tank or a water tank. Thus, the water storage device can be selectively provided according to practical situations to better satisfy the practical requirements.

According to some embodiments of the present disclosure, the fine filter cartridge is configured as a reverse osmosis filter cartridge or a nanofiltration membrane cartridge. Thus, the water quality of the pure water is ensured, and further health of the user is ensured.

Additional aspects and advantages of embodiments of present invention will be given in part in the following descriptions, become apparent in part from the following descriptions, or be learned from the practice of the embodiments of the present invention.

BRIEF DESCRIPTION OF THE DRAWINGS

These and other aspects and advantages of embodiments of the present disclosure will become apparent and more readily appreciated from the following descriptions made with reference to the drawings, in which:

FIG. 1 illustrates a schematic view of a water filtration system according to an embodiment of the present disclosure.

REFERENCE NUMERALS

100: water filtration system;
100*a*: raw water inlet; 100*b*: pure water outlet;
100*c*: purified water outlet; 100*d*: waste water outlet;
101: return flow path;
102: communication flow path;
103: raw water flow path;
104: pure water flow path;
105: purified water flow path;
106: waste water flow path;
107: water storage flow path;
1: integrated filter cartridge:
  10*a*: first port;
  10*b*: second port;
  10*c*: third port;
  10*d*: fourth port;
  10*e*: fifth port;
  10*f*: sixth port;
2: water storage device;
3: water inlet valve;
4: booster pump;
5: one-way valve and high pressure switch;
6: waste water solenoid valve;
7: pure water valve;
8: purified water valve; and
9: throttle valve.

DETAILED DESCRIPTION

Embodiments of the present disclosure will be described in detail and examples of the embodiments will be illustrated in the drawings, where same or similar reference numerals are used to indicate same or similar members or members with same or similar functions. The embodiments described herein with reference to drawings are explanatory, illustrative, and used to generally understand the present disclosure. The embodiments shall not be construed to limit the present disclosure.

Thus, features limited by "first" and "second" are intended to indicate or imply including one or more than one these features. In the description of the present disclosure, the term "a plurality of" means two or more than two, unless specified otherwise.

In the present disclosure, unless specified or limited otherwise, the terms "connected," "coupled" and the like are used broadly, and may be, for example, fixed connections, detachable connections, or integral connections; may also be mechanical or electrical connections; may also be direct connections or indirect connections via intervening structures; may also be inner communications of two elements. These having ordinary skills in the art should understand the specific meanings in the present disclosure according to specific situations.

A water filtration system 100 according to embodiments of the present disclosure will be described below with reference to FIG. 1.

As shown in FIG. 1, the water filtration system 100 according to embodiments of the present disclosure includes: a raw water inlet 100*a*, a pure water outlet 100*b*, a purified water outlet 100*c*, a waste water outlet 100*d* and an integrated filter cartridge 1.

The integrated filter cartridge 1 includes a pre-filter cartridge, a fine filter cartridge and a post-filter cartridge. The integrated filter cartridge 1 has a first port 10*a*, a second port 10*b*, a third port 10*c*, a fourth port 10*d*, a fifth port l0*e* and a sixth port 10*f*. The first port 10*a* is connected to the raw water inlet 100*a*. The second port 10*b* is connected to the purified water outlet 100*c*. The third port 10*c* is connected to a first end of a communication flow path 102, and a second end of the communication flow path 102 is connected to the second port 10*b* and the purified water outlet 100*c* via a T-shaped connector. The fourth port 10*d* is connected to the pure water outlet 100*b*. After filtered by the pre-filter cartridge, the fine filter cartridge and the post-filter cartridge successively, raw water entering the raw water inlet 100*a* is configured to flow out through the pure water outlet 100*b* ; after only filtered by the pre filter cartridge, the raw water entering the raw water inlet 100*a* is configured to flow out through the purified water outlet 100*c*. The fifth port l0*e* is connected to the waste water outlet 100*d*. At least one of a flow path connected to the pure water outlet 100*b* and the sixth port 10*f* is provided with a water storage device 2. A return flow path 101 has a first end connected to the purified water outlet 100*c* and the second port 10*b* via a T-shaped connector and a second end is connected to the waste water outlet 100*d* and the fifth port l0*e* via a T-shaped connector.

It should be noted herein that the resulting water is "pure water" after the raw water is filtered by the pre-filter cartridge, the fine filter cartridge and the post-filter cartridge of the integrated filter cartridge 11, which can be drunk directly; the resulting water is "purified water" after the raw water is only filtered by the pre-filter cartridge of the integrated filter cartridge 11, which can serve as domestic water such as water for washing clothes, for flushing a toilet, etc.

For example, as shown in FIG. 1, the water filtration system 100 may further include a raw water flow path 103, a pure water flow path 104, a purified water flow path 105, a waste water flow path 106 and a water storage flow path 107. Specifically, the first port 10*a* of the integrated filter cartridge 1 is connected to the raw water inlet 100*a* through the raw water flow path 103; the second port 10*b* of the integrated filter cartridge 1 is connected to the purified water outlet 100*c* through the purified water flow path 105; the third port 10*c* of the integrated filter cartridge 1 is connected to the purified water outlet 100*c* through the communication flow path 102, and the third port 10*c* of the integrated filter cartridge 1 is connected to the second port 10*b* of the integrated filter cartridge 1 through the communication flow path 102 and the purified water flow path 105; the fourth port 10*d* of the integrated filter cartridge 1 is connected to the pure water outlet 100*b* through the pure water flow path 104; the fifth port 10*e* of the integrated filter cartridge 1 is connected to the waste water outlet 100*d* through the waste water flow path 106; the water storage device 2 is disposed to the water storage flow path 107, and the water storage device 2 is connected to the sixth port 10*f* of the integrated filter cartridge 1 through the water storage flow path 107. Further, a pure water valve 7 may be disposed at the pure water outlet 100*b* to achieve opening and closing of the pure water outlet 100*b*. Also, a purified water valve 8 may be disposed at the purified water outlet 100*c* to achieve opening and closing of the purified water outlet 100*c*. The first end of the return flow path 101 may be connected to the purified water flow path 105, and the second end of the return flow path 101 may be connected to the waste water flow path 106.

When the pure water is needed, the pure water valve 7 can be opened, and the purified water valve 8 remains in a closed state. The raw water flows from the raw water inlet 100*a* into the integrated filter cartridge 1 successively through the raw water flow path 103 and the first port 10*a*. The raw water becomes the purified water after being filtered by the pre-filter cartridge. The purified water flows out of the integrated filter cartridge 1 through the third port 10*c*, and flows into the integrated filter cartridge 1 again successively through the communication flow path 102, the purified water flow path 105 and the second port 10*b*. The purified water becomes the pure water after filtered by the fine filter cartridge and the post-filter cartridge successively. The pure water flows out of the integrated filter cartridge 1 through the fourth port 10*d*, and flows out successively through the pure water flow path 104 and the pure water outlet 100*b* for use by a user. The pure water can directly serve as drinking water. In this process, the waste water produced flows out of the integrated filter cartridge 1 through the fifth port 10*e*, a part thereof flows through the waste water flow path 106 and flows out from the waste water outlet 100*d*, and the other part thereof returns to the purified water flow path 105 through the return flow path 101 and flows through the second port 10*b* into the integrated filter cartridge 1 for filtration together with the purified water. By partially recycling the waste water of the water filtration system 100 to converge with the purified water, this part of the waste water can be filtered once again by the integrated filter cartridge 1, which can ensure the service life of the fine filter cartridge without increasing a filtration burden on the fine filter cartridge, improve a recycling rate of the water filtration system 100, promote pure water flux of the water filtration system 100, and achieve a water saving effect. The raw water entering through the first port 10*a* can be preliminarily filtered by the pre-filter cartridge, and for example, the pre-filter cartridge can effectively remove rust, sediment and colloid in the water, and absorb residual chlorine, part of organic matter and the like in the water. The water preliminarily filtered by the pre filter cartridge can be finely filtered by the fine filter cartridge, and for example, the fine filter cartridge can effectively remove bacteria, viruses, heavy metal ions and the like in the water. The water finely filtered by the fine filter cartridge can be further filtered by the post-filter cartridge, and for example, the post filter cartridge can effectively remove residual chlorine and organic matter to improve the taste of water.

When the purified water is needed, the purified water valve 8 can be opened, and the pure water valve 7 remains in a closed state. The raw water flows from the raw water inlet 100*a* into the integrated filter cartridge 1 successively through the raw water flow path 103 and the first port 10*a*. The raw water becomes the purified water after being filtered by the pre-filter cartridge. The purified water flows out of the integrated filter cartridge 1 through the third port 10*c*, and flows out successively through the communication flow path 102 and the purified water outlet 100*c*. The purified water can serve as daily domestic water of the user, such as the water for washing clothes. In this process, a small amount of waste water or basically no waste water is produced.

As can be seen from the above, the water filtration system 100 can obtain water of two different kinds of water quality, i.e. the pure water and the purified water used for different purposes, which thus can fully utilize water resources, improve a utilization rate of the water resources, and achieve water conservation.

When a large amount of water is needed, a certain amount of water can be stored in the water storage device 2 in advance. Specially, the pure water valve 7 can be closed, and meanwhile the purified water valve 8 can be closed. The raw water flows from the raw water inlet 100*a* into the integrated filter cartridge 1 successively through the raw water flow path 103 and the first port 10*a*, and flows out of the integrated filter cartridge 1 through the third port 10*c* after being filtered by the pre-filter cartridge. The water flows into the integrated filter cartridge 1 again successively through the communication flow path 102, the purified water flow path 105 and the second port 10*b*, and then flows out of the integrated filter cartridge 1 through the sixth port 10*f* after filtered by the fine filter cartridge. Finally, the water flows into the water storage device 2 through the water storage flow path 107 for storage until the water storage device 2 is full of water. In this process, the waste water produced can also flow out of the integrated filter cartridge 1 through the fifth port 10*e*, a part thereof flows out successively through the waste water flow path 106 and the waste water outlet 100*d*, and the other part thereof returns to the purified water flow path 105 through the return flow path 101 and flows through the second port 10*b* into the integrated filter cartridge 1 for filtration together with the purified water. By providing the water storage device 2, when the pure water valve 7 is opened and the purified water valve 8 remains in the closed state, the water storage device 2 can feed the water in the water storage device 2 into the integrated filter cartridge 1 again successively through the water storage flow path 107 and the sixth port 10*f* by means of pressure (for example, the pressure is applied to the water in the water storage device 2 by the user or other devices) or other powers. The water becomes the pure water after filtered by the post-filter cartridge, and flows out from the pure water outlet 100*b* passing through the pure water flow path 104, which thus satisfies the requirement of the user for a large amount of water.

Certainly, the present disclosure is not limited to this. The water storage flow path 107 at the sixth port 10*f* and the pure water flow path 104 can be provided with the water storage device 2 separately (not illustrated), so as to further satisfy the requirement of the user for a large amount of water. Alternatively, the water filtration system 100 may also not include the water storage flow path 107, in which case the water storage device 2 can be disposed to the pure water flow path 104 (not illustrated). In this case, the requirement of the user for a large amount of water can also be well satisfied and the water filtration system 100 has relatively few components, which reduces an occupied space of the whole water filtration system 100 and saves the costs.

It should be understood that, the purified water outlet 100*c* and the pure water outlet 100*b* may share a water outlet valve. The water outlet valve has three states. That is, when the water outlet valve is in a first state, the purified water outlet 100*c* is opened and the pure water outlet 100*b* is closed; when the water outlet valve is in a second state, the purified water outlet 100*c* is closed and the pure water outlet 100*b* is closed; when the water outlet valve is in a third state, the purified water outlet 100*c* is closed, and the pure water outlet 100*b* is opened. Thus, the components of the water filtration system 100 can be further reduced. The above water outlet valve may be configured as a three-way valve, but it is not limited to this.

In the water filtration system 100 according to embodiments of the present disclosure, the water filtration system 100 is provided with the return flow path 101, and the return flow path 101 has the first end connected to the purified water outlet 100*c* and the second port 10*b* via a T-shaped connector and the second end connected to the waste water outlet 100*d* and the fifth port 10*e* via a T-shaped connector, so that part of the waste water of the water filtration system 100 can be recycled so as to flow into the integrated filter cartridge 1 again for filtration. Thus, under the premise of ensuring the service life of the fine filter cartridge, the recycling rate of the water filtration system 100 is improved, and the water saving effect is achieved. Furthermore, by disposing the water storage device 2 to at least one of the flow path connected to the pure water outlet 100*b* and the sixth port 10*f* of the water filtration system 100, the requirement of the user for a large amount of water can be satisfied. Meanwhile, the integrated filter cartridge 1 is provided with the first port 10*a*, the second port 10*b*, the third port 10*c*, the fourth port 10*d* and the fifth port 10*e*. The first port 10 is connected to the raw water inlet 100*a* of the water filtration system 100; the second port 10*b* is connected to the purified water outlet 100*c* ; the second end of the communication flow path 102 at the third port 10*c* is connected to the second port 10*b* and the purified water outlet 100*c* via a T-shaped connector; the fourth port 10*d* is connected to the pure water outlet 100*b* ; the fifth port 10*e* is connected to the waste water outlet 100*d*. Thus, the water filtration system 100 can obtain water of two kinds of water quality, i.e. the pure water and the purified water used for different purposes, and the water resources can be fully utilized, which improves the utilization rate of the water resources and achieves the water conservation. In addition, by employing the integrated filter cartridge 1 composited of the pre-filter cartridge, the fine filter cartridge and the post-filter cartridge, the integrated filter cartridge 1 is configured as an integrated structure, which facilitates replacement of the integrated filter cartridge 1, reduces a volume of the integrated filter cartridge 1, and meanwhile simplifies the connection between flow paths of the water filtration system 100 to improve the applicability of the water filtration system 100.

In some embodiments of the present disclosure, as shown in FIG. 1, the return flow path 101 is provided with a throttle valve 9. The throttle valve 9 is used to throttle the waste water in the return flow path 101, so that a water inlet pressure in the integrated filter cartridge 1 before the fine filter cartridge can be maintained.

Further, a flow path connected to the waste water outlet 100*d* is provided with a waste water valve, and the waste water valve is configured to achieve opening and closing of the waste water outlet 100*d*. In some embodiments, the waste water valve may be a waste water solenoid valve 6, and the waste water solenoid valve 6 is in a deenergized state normally, in which case a small hole is defined in the waste water solenoid valve 6 to ensure communication of the waste water flow path 106, and to maintain the water inlet pressure in the integrated filter cartridge 1 before the fine filter cartridge. It should be understood that, the specific structure and working principle of the waste water solenoid valve 6 is well known to those skilled in the art, which will not be described herein. Certainly, the waste water valve may also be a waste water manual valve, but it is not limited to this.

For example, in an example shown in FIG. 1, the return flow path 101 is provided with the throttle valve 9, and the flow path connected to the waste water outlet 100*d* is provided with the waste water solenoid valve 6. The throttle valve 9 can throttle the waste water in the return flow path 101, and the waste water solenoid valve 6 can throttle the waste water in the waste water flow path 106, so that the water inlet pressure in the integrated filter cartridge 1 before the fine filter cartridge can be maintained. Furthermore, the return flow path 101 can enable part of the waste water to flow back to the purified water flow path 105, and flow into the integrated filter cartridge 1 for filtration, so that the recycling rate of the water filtration system 100 is improved, and the pure water flux of the water filtration system 100 is promoted.

In some embodiments, the return flow path 101 is provided with a switch (not illustrated), and the switch can achieve communication and blockage of the return flow path 101. When the water quality of the raw water is good without increasing the filtration burden on the fine filter cartridge or when water consumption of the user is too large, the switch in the return flow path 101 can be closed, to disconnect the first end of the return flow path 101 from the second end of the return flow path 101. In this case, the waste water produced by the water filtration system 100 can only be discharged via the waste water outlet 100*d* through the waste water flow path 106. Since the waste water of the water filtration system 100 is throttled only in the waste water flow path 106, waste water flux of the water filtration system 100 is reduced, and the pure water flux of the water filtration system 100 is promoted. When the water quality of the raw water is poor, the switch in the return flow path 101 requires to be opened, to communicate the first end of the return flow path 101 with the second end of the return flow path 101. In this case, part of the waste water produced by the water filtration system 100 flows out successively through the waste water flow path 106 and the waste water outlet 100*d*, and the other part of the waste water flows back to the purified water flow path 105 through the return flow path 101 and flows through the second port 10*b* into the integrated filter cartridge 1 for filtration together with the purified water, so that the recycling rate of the water filtration system 100 is improved, and the pure water flux of the water filtration system 100 is promoted. It should be understood that, when the above switch is disposed to the return flow path 101, the throttle valve 9 can be disposed to the return flow path 101 at the same time, or no throttle valve 9 is disposed to the return flow path 101, both of which will promote the pure water flux of the water filtration system 100.

It should be understood that, the return flow path 101 may be provided with a flow control valve (not illustrated), such as a flow control solenoid valve. The flow control valve can be adjusted based on parameters, such as the water quality of the raw water, to adjust the waste water flux in the return flow path 101, so that under the premise of ensuring the service life of the fine filter cartridge, the purpose of promoting the pure water flux of the water filtration system 100 is achieved, and the water saving effect is achieved. For example, when the water quality of the raw water is good, the waste water flux in the return flow path 101 can be reduced by adjusting the flow control valve; when the water quality of the raw water is poor, the waste water flux in the return flow path 101 can be increased by adjusting the flow control valve, both of which can improve the recycling rate of the water filtration system 100.

In some optional embodiments of the present disclosure, the pre-filter cartridge is disposed separately from the fine filter cartridge and the post-filter cartridge. That is, in the integrated filter cartridge 1, the pre-filter cartridge is disposed individually and separated from the fine filter cartridge and the post-filter cartridge, as long as the pre-filter cartridge is located upstream of the fine filter cartridge and the post-filter cartridge, so that the flow path inside the integrated filter cartridge 1 can be simplified. It should be understood that, the pre-filter cartridge may also be disposed without being separated from the fine filter cartridge and the post filter cartridge. For example, the pre-filter cartridge can be fitted over exteriors of the fine filter cartridge and the post filter cartridge.

In some embodiments, the pre-filter cartridge is located at the top of the fine filter cartridge and the post-filter cartridge. For example, in an example shown in FIG. 1, the raw water flows from the raw water inlet 100*a* into the integrated filter cartridge 1 successively through the raw water flow path 103 and the first port 10*a*. The purified water obtained after being filtered by the pre-filter cartridge flows out through third port 10*c*. Since the pre-filter cartridge is disposed at the top of the fine filter cartridge and the post-filter cartridge, the first port 10*a* and the third port 10*c* both can be disposed in an upper portion of the integrated filter cartridge 1, while the second port 10*b*, the fourth port 10*d*, the fifth port 10*e* and the sixth port 10*f* can be all disposed in a lower portion of the integrated filter cartridge 1, so that the ports of the integrated filter cartridge 1 are arranged in a dispersed manner, thereby facilitating connections between ports of the integrated filter cartridge 1 and flow paths of the water filtration system 100.

In some embodiments of the present disclosure, a water inlet valve 3 and a booster pump 4 are disposed between the second port 10*b* and the purified water outlet 100*c*. The water inlet valve 3 is located between the purified water outlet 100*c* and the booster pump 4, of which the second end of the communication flow path 102 is located at a side of the water inlet valve 3 adjacent to the purified water outlet 100*c*, and the first end of the return flow path 101 is located between the water inlet valve 3 and the booster pump 4. For example, as shown in FIG. 1, the water inlet valve 3 and the booster pump 4 may be disposed along the purified water flow path 105 and spaced apart from each other. The water inlet valve 3 is configured to control the communication and blockage of the purified water flow path 105. When the water inlet valve 3 is opened, and the purified water valve 8 remains in the closed state, the purified water filtered by the pre-filter cartridge can flow through the purified water flow path 105 into the integrated filter cartridge 1 for filtration; when the water inlet valve 3 is closed, the purified water filtered by the pre-filter cartridge cannot flow into the integrated filter cartridge 1 through the purified water. The booster pump 4 is configured to improve a pressure of the purified water to ensuring that the purified water can permeate into the fine filter cartridge for filtration. Specifically, when the water inlet valve 3 is opened, and the booster pump 4 operates and the purified water valve 8 remains in the closed state, the purified water flowing to the integrated filter cartridge 1 has a larger pressure, so that the purified water can smoothly permeate into the fine filter cartridge for filtration. In this case, the pure water obtained can flow out successively through the fourth port 10*d*, the pure water flow path 104 and the pure water outlet 100*b*. Part of the waste water can flow back to the purified water flow path 105 between the water inlet valve 3 and the booster pump 4 through the return flow path 101, and can flow into the integrated filter cartridge 1 for filtration together with the purified water. When the water inlet valve 3 is closed, only the purified water can be obtained. In this case, the purified water valve 8 can be opened, and the purified water flows out successively through the third port 10*c*, the communication flow path 102 and the purified water outlet 100*c*.

The second end of the communication flow path 102 is located at the side of the water inlet valve 3 adjacent to the purified water outlet 100*c*, so that the raw water becomes the purified water after being filtered by the pre-filter cartridge of the integrated filter cartridge 1, and the purified water flows to the water inlet valve 3 and the booster pump 4. The pre-filter cartridge removes impurities in the raw water to prevent the water inlet valve 3 and the booster pump 4 from being clogged by those impurities, thereby ensuring normal operation of the water filtration system 100. Furthermore, it is unnecessary to provided components, such as a pre-filtering mesh, upstream of the water inlet valve 3, which reduces components of the water filtration system 100, and simplifies the water filtration system 100. Moreover, since the first end of the return flow path 101 is located between the water inlet valve 3 and the booster pump 4, it is possible to prevent the purified water from flowing into the return flow path 101 when the first end of the return flow path 101 is located upstream of the water inlet valve 3; and it is also possible to prevent part of the waste water in the return flow path 101 from failing to flow into the integrated filter cartridge 1 due to the pressurization of the booster pump 4 when the first end of the return flow path 101 is located downstream of the booster pump 4. From the above mentioned, the water filtration system 100 can obtain water of two kinds of water quality, i.e. the pure water and the purified water, to improve the utilization rate of the water resources. The water inlet valve 3 may be configured as a solenoid valve, but it is not limited to this.

It should be understood that, the water inlet valve 3 and the booster pump 4 may not be disposed between the second port 10*b* and the purified water outlet 100*c*. In this case, the waste water valve requires to be disposed to the waste water flow path 105. The waste water valve can be configured as a waste water manual valve, the purified water valve 8 can be configured as a purified water manual valve, and the pure water valve 7 can be configured as a pure water manual valve, so that it is only necessary to adjust opening and closing of the purified water manual valve, the pure water manual valve and the waste water manual valve without need for any electric equipment such as the booster pump 4 during the use of the water filtration system 100, which simplifies the water filtration system 100, and achieves the purpose of saving electricity and costs. Specifically, when the purified water is needed, the purified water manual valve can be opened, and the pure water manual valve remains in the closed state, such that the raw water flows out through the third port 10*c* after filtered by the integrated filter cartridge 1, and flows out successively through the communication flow path 101 and the purified water outlet 100*c* for use by the user, in which case basically no waste water is produced, and the waste water manual valve can remain in the closed state; when the pure water is needed, the pure water manual valve and the waste water manual valve can be opened, while the purified water manual valve remains in the closed state, such that the raw water can permeate into the fine filter cartridge for filtration, flow out of the integrated filter cartridge 1 through the fourth port 10*d*, and finally flow out successively through the pure water flow path 104 and the pure water outlet 100*b* for use by the user, and at the same time part of the waste water produced flows out successively through the waste water flow path 106 and the waste water outlet 100*d*, and the other part of the waste water flows back to the purified water flow path 105 through the return flow path 101 and flows into the integrated filter cartridge 1 for filtration together with the purified water.

Similarly, it is possible that only the water inlet valve 3 is disposed between the second port 10*b* and the purified water outlet 100*c* and the booster pump 4 is not disposed between the second port 10*b* and the purified water outlet 100*c*. The water inlet valve 3 can be configured as a water inlet manual valve, the purified water valve 8 can be configured as the purified water manual valve, and the pure water valve 7 can be configured as the pure water manual valve, so that it is only necessary to adjust opening and closing of the purified water manual valve, the pure water manual valve and the waste water manual valve without need for any electric equipment such as the booster pump 4 during the use of the water filtration system 100, which simplifies the water filtration system 100. Specifically, when the purified water is needed, the water inlet manual valve and the purified water manual valve can be opened, and the pure water manual valve remains in the closed state, such that the raw water flows out through the third port 10*c* after filtered by the integrated filter cartridge 1, and flows out successively through the communication flow path 101 and the purified water outlet 100*c* for use by the user, in which case basically no waste water is produced; when the pure water is needed, the water inlet manual valve and the pure water manual valve can be opened, and the purified water manual valve remains in the closed state, such that the raw water can permeate into the fine filter cartridge for filtration, flow out of the integrated filter cartridge 1 through the fourth port 10*d*, and finally flow out successively through the pure water flow path 104 and the pure water outlet 100*b* for use by the user, and at the same time part of the waste water produced flows out successively through the waste water flow path 106 and the waste water outlet 100*d*, and the other part of the waste water flows back to the purified water flow path 105 through the return flow path 101 and flows into the integrated filter cartridge 1 for filtration together with the purified water. However, the present disclosure is not limited to this.

Further, the water storage device 2 is provided with a detection device (not illustrated). The detection device includes at least one of a pressure detection device and a liquid level detection device. When the detection device detects that the water storage device 2 is not full of the liquid, a controller (not illustrated) of the water filtration system 100 will control the water inlet valve 3 to open and control the booster pump 4 to operate. Thus, by providing the water storage device 2 with the detection device that can detect whether the water storage device 2 is full of the liquid, an automatic water storage function of the water filtration system 100 can be achieved so as to satisfy a requirement of water supply.

For example, as shown in FIG. 1, the pure water valve 7 is closed, the purified water valve 8 is closed, and the detection device can detect in real time whether the water stored in the water storage device 2 has filled up the water storage device 2. When the detection device detects that the water storage device 2 is not full of the water, a signal will be transmitted to the controller by the detection device, and the controller controls the water inlet valve 3 to open and controls the booster pump 4 to operate, such that the purified water obtained after the raw water is filtered by the pre filter cartridge flows into the integrated filter cartridge 1 successively through the communication flow path 102 and the purified water flow path 105, flows out of the integrated filter cartridge 1 through the sixth port 10*f* after filtered by the fine filter cartridge, and finally flows into the water storage device 2 for storage through the water storage flow path 107 until the water storage device 2 is full. When the detection device detects that the water storage device 2 is full of the water, a signal will be transmitted to the controller, and the controller will control the water inlet valve 3 to close and control the booster pump 4 to stop operating.

In some embodiments, the pressure detection device is configured as a pressure sensor, and the liquid level detection device is configured as a liquid level sensor. The pressure sensor can be configured to detect the pressure of the liquid in the water storage device 2, and the liquid level sensor can be configured to detect a liquid level of the liquid in the water storage device 2, so that the water filtration system 100 is more intelligent and efficient, which greatly facilitates the user.

When the pressure detection device is configured as the pressure sensor, and the pressure detected by the pressure sensor is smaller than a set value thereof (for example, the pressure of the liquid when the water storage device 2 is full of the liquid is configured as the set value), the controller controls the water inlet valve 3 to open and controls the booster pump 4 to start, such that the raw water flows into the water storage device 2 after being filtered by the pre-filter cartridge and the fine filter cartridge successively, until the water storage device 2 is full of the water; when the pressure detected by the pressure sensor reaches the set value thereof, and the controller controls the water inlet valve 3 to close and controls the booster pump 4 to stop operating.

When the liquid level detection device is configured as the liquid level sensor, and the liquid level detected by the liquid level sensor is lower than a preset value thereof (for example, the liquid level of the liquid when the water storage device 2 is full of the liquid is configured as the preset value), the controller controls the water inlet valve 3 to open and controls the booster pump 4 to start, such that the raw water flows into the water storage device 2 after being filtered by the pre-filter cartridge and the fine filter cartridge successively, and the amount of the water in the water storage device 2 increases gradually until the water storage device 2 is full of the water; when the liquid level detected by the liquid level sensor reaches the preset value, the controller controls the water inlet valve 3 to close and controls the booster pump 4 to stop operating.

It should be understood that, the water storage device 2 may not be provided with any detection device. For example, the water storage device 2 may be transparent, so that the user can observe the water level in the water storage device 2 directly. When the user observes that the water storage device 2 is not full of the liquid, i.e. the water level is low, the water inlet manual valve can be opened, and the pure water manual valve and the purified water manual valve both remain in the closed state, so as to achieve the water storage function of the water storage device 2. However, the present disclosure is not limited to this. Thus, the detection of the water storage of the water storage device 2 may not need any electric detection devices, such as the pressure sensor or the liquid level sensor, during the use of the water filtration system 100, thereby achieving the purpose of saving electricity and costs.

Further, the pre-filtering mesh (not illustrated) is disposed between the first port 10*a* and the raw water inlet 100*a*, that is, the pre-filtering mesh is disposed to the raw water flow path 103 to filter macroscopic objects in the raw water, for example, large particle impurities such as rust, so that the raw water flow path 103 can be prevented from being clogged, and the pre-filter cartridge can be protected so as to extend the service life of the pre-filter cartridge.

In some embodiments of the present disclosure, a one-way valve and a high pressure switch are disposed between the fourth port 10*d* and the pure water outlet 100*b*, and the one-way valve and the high pressure switch are integrated into one piece. The one-way valve can prevent the pure water in the pure water flow path 104 from flowing back into the integrated filter cartridge 1; the high pressure switch can detect the pressure at its location, and transmit a detection signal to the controller; the controller controls operations of the water inlet valve 3 and the booster pump 4 to achieve feedback controls of the water inlet valve 3 and the booster pump 4.

For example, in an example shown in FIG. 1, the one-way valve and the high pressure switch between the fourth port 10*d* and the pure water outlet 100*b* are integrated into a one-way valve and high pressure switch 5. Thus, by integrating the one-way valve and the high pressure switch into a whole, the number of components of the water filtration system 100 is reduced, which simplifies the water filtration system 100.

When the pure water is needed, the pure water valve 7 can be opened, and the purified water valve 8 remains in the closed state, the high pressure switch can detect that the pressure at its location is smaller than a set pressure $p_1$, in which the set pressure $p_1$ can satisfy: 0.2 MPa≤$p_1$≤0.25 MPa, and transmit a signal to the controller, and the controller controls the water inlet valve 3 to open and controls the booster pump 4 to operate, such that the raw water flows from the raw water inlet 100*a* into the integrated filter cartridge 1 successively through the raw water flow path 103 and the first port 10*a*, and becomes the pure water after filtered by the integrated filter cartridge 1, and the pure water finally flows out through the pure water outlet 100*b* for direct drinking by the user. Then, the pure water valve 7 can be closed; since the one-way valve limits backflow of the water, the pressure at the location of the high pressure switch increases gradually; when the foregoing pressure reaches the set pressure $p_1$, the high pressure switch transmit a signal to the controller, and the controller controls the water inlet valve 3 to close and controls the booster pump 4 to stop operating. It should be understood that, the set pressure $p_1$ of the high pressure switch may be set according to practical situations to better satisfy the requirement of the user.

When the purified water is needed, the purified water valve 8 can be opened, and the pure water valve 7 remains in the closed state, such that the raw water flows from the raw water inlet 100*a* into the integrated filter cartridge 1 successively through the raw water flow path 103 and the first port 10*a*, and becomes purified water after being filtered by the pre-filter cartridge; the purified water flows out of the integrated filter cartridge 1 through the third port 10*c*, and flows out successively through the communication flow path 102 and the purified water outlet 100*c* for use by the user. In this case, even if the pure water valve 7 is opened, no pure water will flow out through the pure water outlet 100*b*. Then, the purified water valve 8 can be closed, and the purified water cannot flow out through the purified water outlet 100*c*.

Certainly, in other embodiments of the present disclosure, the one-way valve and the high pressure switch can also be disposed separately from each other (not illustrated). It should be understood that, only the one-way valve may be disposed between the fourth port 10*d* and the pure water outlet 100*b* and no high pressure switch is disposed between the fourth port 10*d* and the pure water outlet 100*b*, so as to further simplify a structure of the water filtration system 100 and reduce costs.

In some embodiments, the water storage device 2 is configured as a water storage bag, a pressure tank or a water tank, and so on. The water storage bag or the pressure tank may be connected to the sixth port 10*f*, and the water tank may be disposed to the pure water flow path 104, so that the requirement of the user for a large amount of water can be satisfied. The water storage bag is foldable and easy to store, and has a small volume, and water storage bags of various specifications can be customized according to the requirement of the user to better satisfy the requirement of the user. The pressure tank is safe, reliable and economical, and furthermore, the pressure tank can utilize compressibility of air in the tank to adjust the amount of the water to be stored. The water tank will not pollute the water, thereby ensuring purity and hygiene of the water, and furthermore, the water tank has high strength and light weight, and a neat and artistic appearance, and is easy to clean.

In some embodiments, the fine filter cartridge is configured as a reverse osmosis filter cartridge or a nanofiltration membrane cartridge and the like. Since the reverse osmosis membrane can filter the bacteria, viruses, heavy metal ions and the like in the water, the reverse osmosis filter cartridge can strictly separate the water which can permeate the reverse osmosis membrane from concentrated water which cannot permeate the reverse osmosis membrane. The nanofiltration membrane can remove organic matter and chroma in the water, partially remove dissolved salts, and remove hardness of the water. Furthermore, the nanofiltration membrane filter cartridge can also strictly separate the water which can permeate the nanofiltration membrane from the concentrated water which cannot permeate the nanofiltration membrane. Thus, regardless of employing the reverse osmosis filter cartridge or the nanofiltration membrane filter cartridge, the fine filter cartridge can obtain high filtration accuracy, and the water passing through the fine filter cartridge has better water quality, thereby ensuring the water quality of the pure water and ensuring the health of the user.

After the water filtration system 100 is used for a period of time, the integrated filter cartridge 1 needs to be cleaned, in which case the pure water valve 7 and the purified water valve 8 can be closed, and the controller controls the water inlet valve 3 to open, the booster pump 4 to operate, and the waste water solenoid valve 6 to be energized (in which case the waste water solenoid valve 6 is fully opened), such that the raw water flows from the first port l0*a* into the integrated filter cartridge 1, flows out through the third port 10*c* after flushing the pre-filter cartridge, and flows into the integrated filter cartridge 1 again successively through the communication flow path 102, the purified water flow path 105 and the second port 10*b* to flush the fine filter cartridge, so that the impurities attached to the pre-filter cartridge and the fine filter cartridge of the integrated filter cartridge 1 can be removed to allow the integrated filter cartridge 1 to continue to be used, thereby extending the service life of the integrated filter cartridge 1.

Certainly, when the water filtration system 100 is not provided with any electric equipment such as the booster pump 4, the detection device, or the high pressure switch, that is, there is no need to provide electrical energy for the water filtration system 100, the water filtration system 100 can also operate normally. For example, the water inlet valve 3 is configured as the water inlet manual valve, the pure water valve 3 is configured as the pure water manual valve, the purified water valve 8 is configured as the purified water manual valve, and the waste water valve is configured as the waste water manual valve. In this case, when the integrated filter cartridge 1 is to be cleaned, the pure water manual valve and the purified water manual valve can be closed, and the water inlet manual valve and the waste water manual valve can be opened (in which case the waste water manual valve is fully opened), such that the raw water flows from the first port 10*a* into the integrated filter cartridge 1 to flush the pre filter cartridge and the fine filter cartridge successively, which can also extend the service life of the integrated filter cartridge 1.

Other constitutions and operations of the water filtration system 100 according to embodiments of the present disclosure are well known by those skilled in the art, which will not be described in detail herein.

Reference throughout this specification to "an embodiment," "some embodiments," "an illustrative embodiment" "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

Although embodiments of the present disclosure have been shown and illustrated, it shall be understood by those skilled in the art that various changes, modifications, alternatives and variants without departing from the principle of the present disclosure are acceptable. The scope of the present disclosure is defined by the claims or the like.

What is claimed is:

1. A water filtration system comprising:

a raw water inlet;

a pure water outlet;

a purified water outlet;

a waste water outlet;

an integrated filter cartridge comprising a pre-filter cartridge, a fine filter cartridge and a post-filter cartridge united into a single cartridge unit, and having on an outer surface thereof a first port, a second port, a third port, a fourth port, a fifth port and a sixth port, wherein the second port, the fourth port, the fifth port and the sixth port are located adjacent one another on the outer surface and distant from the first port and the third port, wherein the first port is connected to the raw water inlet via a raw water flow path, the second port is connected to the purified water outlet via a purified water flow path, a first end of a communication flow path is connected to the third port, a second end of the communication flow path is connected to the second port and the purified water outlet, the fourth port is connected to the pure water outlet via a pure water flow path, the fifth port is connected to the waste water outlet via a waste water flow path, the sixth port is connected to a water storage device via a water storage flow path, and a first end of a return flow path is connected to the purified water outlet and the second port via the purified water flow path and a second end of the return flow path is connected to the waste water outlet and the fifth port via the waste water flow path, such that raw water entering the raw water inlet flows through the raw water flow path and comes out through the pure water flow path and then the pure water outlet after being filtered by the pre-filter cartridge, the fine filter cartridge and the post-filter cartridge successively, the raw water entering the raw water inlet enters the water storage device through the water storage flow path after being filtered by the pre-filter cartridge and the fine filter cartridge successively and water in the water storage device then flows out through the pure water flow path and then the pure water outlet after being filtered by the post-filter cartridge, and the raw water entering the raw water inlet flows out through the purified water flow path and then the purified water outlet after being only filtered by the pre-filter cartridge.

2. The water filtration system according to claim 1, wherein the return flow path is provided with a throttle valve.

3. The water filtration system according to claim 1, wherein the return flow path is provided with a flow control valve.

4. The water filtration system according to claim 1, wherein the return flow path is provided with a switch.

5. The water filtration system according to claim 1, wherein the pre-filter cartridge is disposed separately from the fine filter cartridge and the post-filter cartridge.

6. The water filtration system according to claim 1, wherein a flow path connected to the waste water outlet is provided with a waste water valve.

7. The water filtration system according to claim 1, wherein a water inlet valve and a booster pump are disposed between the second port and the purified water outlet, the water inlet valve is located between the purified water outlet and the booster pump, the second end of the communication flow path is located at a side of the water inlet valve adjacent to the purified water outlet, and the first end of the return flow path is located between the water inlet valve and the booster pump.

8. The water filtration system according to claim 7, wherein the water storage device is provided with a detection device, the detection device comprises at least one of a pressure detection device and a liquid level detection device, and after the detection device detects that the water storage device is not full of liquid, a controller of the water filtration system is triggered to control the water inlet valve to open and controls the booster pump to operate.

9. The water filtration system according to claim 1, wherein a pre-filtering mesh is disposed between the first port and the raw water inlet.

10. The water filtration system according to claim 1, wherein a one-way valve and a high pressure switch are disposed between the fourth port and the pure water outlet, and the one-way valve and the high pressure switch are integrated into one piece.

11. The water filtration system according to claim 1, wherein the water storage device is one selected from the group consisting of a water storage bag, a pressure tank, and a water tank.

12. The water filtration system according to claim 1, wherein the fine filter cartridge is one selected from the group consisting of a reverse osmosis filter cartridge and a nanofiltration membrane filter cartridge.

* * * * *